June 29, 1965     H. I. SHRUBSALL     3,192,356
WELDING OF RAILROAD RAILS

Filed Sept. 24, 1962     3 Sheets-Sheet 1

INVENTOR.
H. I. SHRUBSALL

ATTORNEY

June 29, 1965  H. I. SHRUBSALL  3,192,356
WELDING OF RAILROAD RAILS
Filed Sept. 24, 1962  3 Sheets-Sheet 3

INVENTOR.
H. I. SHRUBSALL
BY
ATTORNEY

United States Patent Office 3,192,356
Patented June 29, 1965

3,192,356
WELDING OF RAILROAD RAILS
Harry I. Shrubsall, Scotch Plains, N.J., assignor to Union Carbide Corporation, a corporation of New York
Filed Sept. 24, 1962, Ser. No. 225,811
6 Claims. (Cl. 219—73)

This invention relates to the welding of railroad rails and, more particularly, to a process for vertical automatic butt welding of rail sections either in or alongside track.

It has been evident that the use of railroad tracks in the form of rail sections welded together to form a continuous strip is particularly desirable over track which is bolted or otherwise secured together. Up until now, however, there has been no widespread use of welded rail sections since the known processes (gas pressure welding and electric flash welding) have resulted in a large number of unsatisfactory welds which must be rewelded.

Another disadvantage of known processes for welding track is that "long" rail heretofore had to be joined in prescribed lengths and then transported to field location and installed in track.

It is accordingly a main object of the present invention to provide a process for joining rails in track to eliminate the need for transporting rail to and from permanent rail welding plants.

A further object is to provide a process whereby good weld quality is consistently obtained.

Yet another object is to provide a process which will be more economical than presently employed processes.

These and other objects, together with the manner of operation, will best be understood by reference to the following detailed description read with reference to the drawings wherein.

Figure 1:
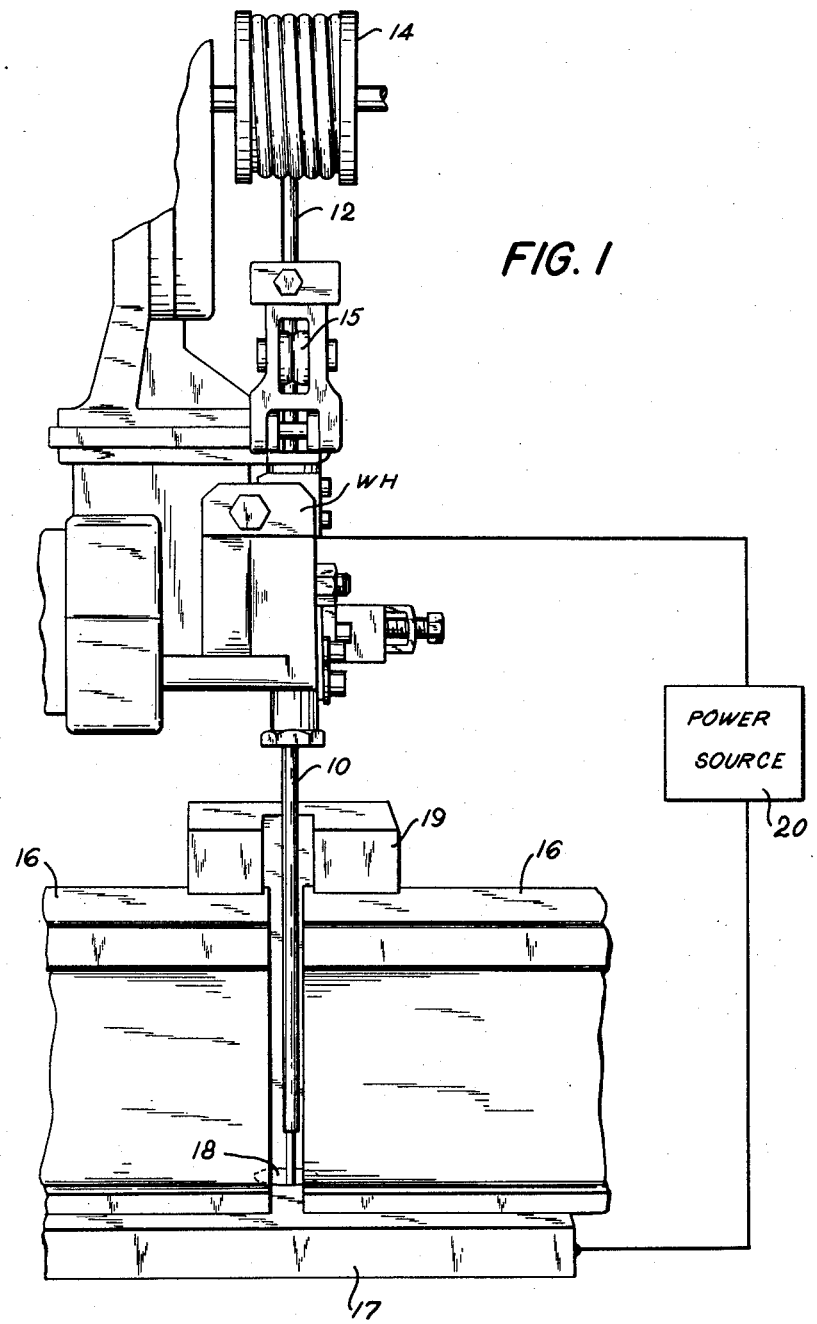
FIGURE 1 is an elevation of typical apparatus for carrying out the preferred mode of operation.
Figure 2:
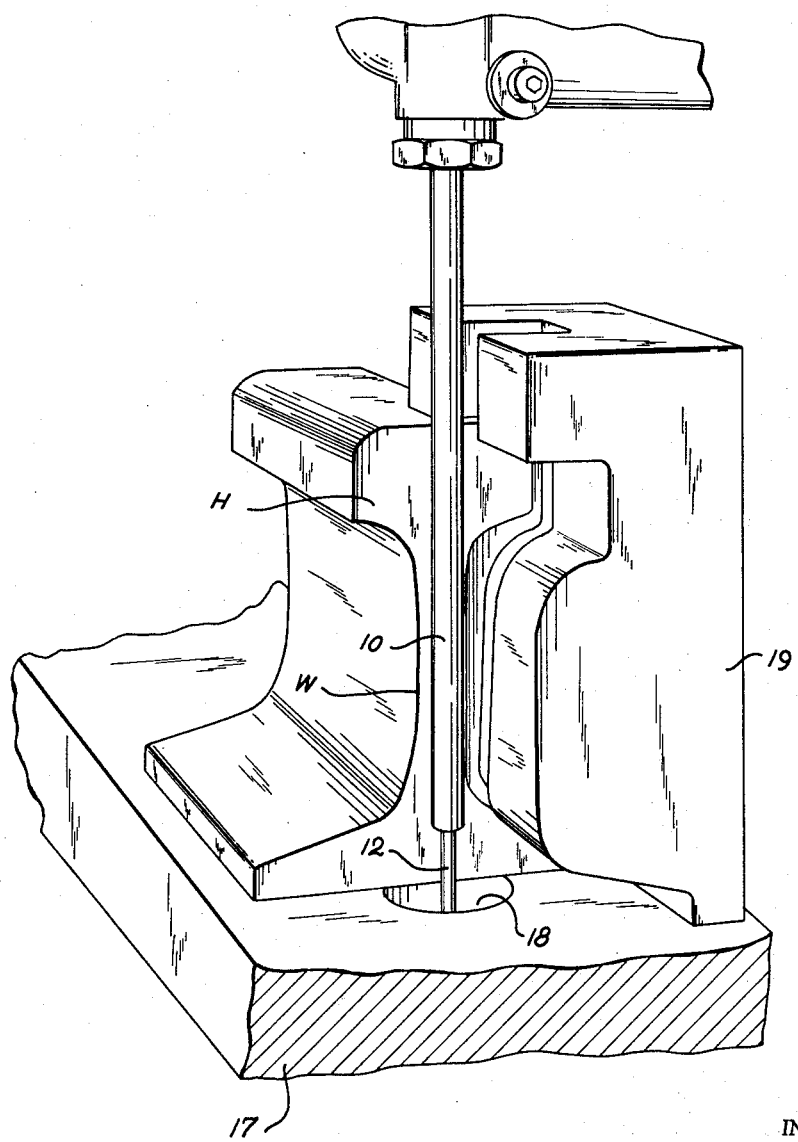
FIGURE 2 is an enlarged view partially in section of the preferred embodiment.
Figure 3:
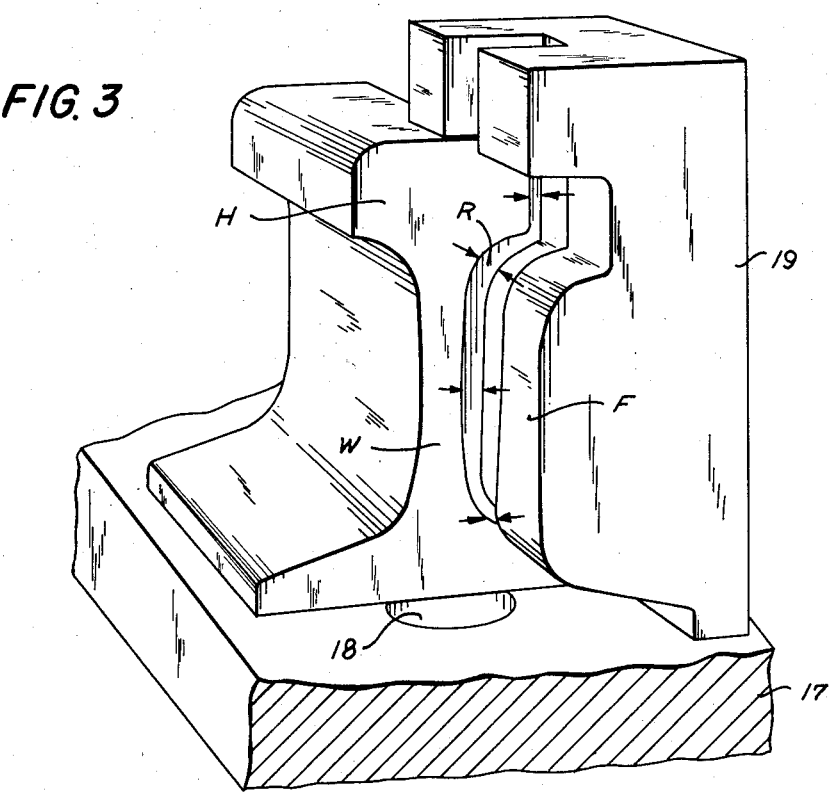
FIGURE 3 is an enlarged view illustrating the relationship of the rail to the weld-shaping member.

As was pointed out above, there has not been widespread use of welding in joining rails since the known processes resulted in a large number of poor welds. By the method of this invention, I have provided a process wherein good sound rail welds can be made simply and economically.

Briefly, my invention comprises the steps of placing the rails to be welded with their faces in parallel spaced relation and supporting the rails on a base member. The base member is provided with a starting reservoir for the weld to be made and such reservoir is centered on the space between the rails. A current-carrying member is positioned in the space between the rail faces. Weld shaping members contoured to fit the rails are placed on the rails to form a cavity enclosing the current-carrying member and to define the shape of the weld to be made. A consumable wire is passed through one end of the current-carrying member until it emerges from the other end. A measured amount of a first welding composition is placed in the starting reservoir sufficient to cover the end of the consumable wire. Initially, an arc is then struck between the consumable wire and the starting reservoir. This initial arc is maintained at an arc current of from about 500 to about 600 amperes at a voltage of from about 35 to 37 volts until a quiescent condition is achieved. The current is then increased from about 700 to about 800 amperes. The consumable wire is progressively consumed to make the weld and a second different welding composition is added during the progression of the weld to maintain the quiescent condition. When the molten puddle raises to a point at the juncton of the rail web to the rail head section, the consumable wire is oscillated parallel to the rail faces. Finally, the arc current is reduced to about 400 amperes when the weld puddle reaches the top of the head section and the process continued until completion.

In the foregoing defined process, there are several steps which are critical to obtaining welds which will have required mechanical and physical properties.

During the early stages of the development of the process of the invention, it was impossible to make a sound weld at the rail base section. The finished weld was always porous and contained inclusions which, of course, reduced the strength of the weld. Finally, it was discovered that a starting reservoir having the depth of about 1 in. and approximate diameter of 2 in., wherein the weld was commenced under a first welding composition, resulted in a weld which was free from porosity and inclusions.

In the preferred mode of operation for joining 115 RE and 127 Dudley rail sections, about 0.35 to about 0.40 lb. of a first composition is placed in the starting reservoir to cover the starting fuse ball and to come in contact with the end of the current-carrying member. This first composition which has been found to be uniquely desirable has the following analysis:

|  | Minimum, Percent | Preferred, Percent | Maximum, Percent |
|---|---|---|---|
| $CaO+BaO$ | 19.50 | 21.00 | 22.50 |
| $CaF_2$ | 5.00 | 6.00 | 7.00 |
| $MgO$ | 10.00 | 11.00 | 12.00 |
| $SiO_2$ | 34.00 | 36.00 | 38.00 |
| $Al_2O_3$ | 11.50 | 12.50 | 13.50 |
| $MnO$ | 6.00 | 7.00 | 8.00 |
| $Cr_2O_3$ | 4.50 | 5.00 | 5.50 |
| $MoO_3$ | 0.50 | 0.70 | 1.00 |

Conventional welding compositions produced major shrink cavities in the weld area at the junction of the web and base sections. Moreover, these conventional welding compositions do not weld the abutting faces of the rail consistently in these areas. The above described starting compositions produced uniform consistent fusion in the rail base and web section and does not produce shrink cavities in these areas.

After the welding action becomes quiescent, a second different welding composition is added. In the preferred embodiment, approximately 0.30 to about 0.40 lb. of composition having the following analysis was added to the weld.

Weight percent
$CaO+BaO$ _____ max__ 5.00
$SiO_2$ _____ 43.00–47.00
$Al_2O_3$ _____ 21.00–25.00
$FeO$ _____ max__ 3.00
$MgO$ _____ 23.00–27.00
$Cr_2O_3$ _____ max__ 3.00
$S$ _____ max__ 0.07
$CaF_2$ _____ 3.50–5.50

This second composition is a necessary additive in order to produce a sound weld in the web and head area of the weld. The first composition has excellent fusion welding characteristics, needed in the base section, which if continued would produce an excessively diluted weld in the web and head section. By adding the second composition to the first when the weld has progressed to the web section, fusion characteristics are altered to produce the desired degree of fusion in the remaining portions of the weld. The second composition, moreover, produces a smooth finish on the weld and is easy-detaching. The first composition, if continued unchanged in the web and head sections, produces an undesirable rough finish susceptible to fatigue failure in service.

Figure 4:
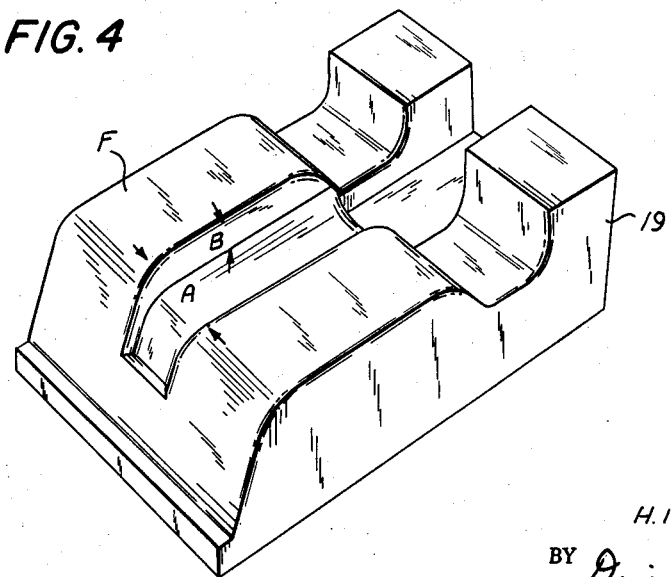
FIGURE 4 is a perspective of the weld-shaping member.

I have also found that the contour of the weld shaping members is important for obtaining successful welds. In order to avoid undercutting along the vertical weld joining 115 lb. RE rail sections spaced ¾ in. from each other, I have found that the groove in the shaping members should be about 1 3/16 in. in width so that the groove width is about ¼ in. greater than the space on each side. The depth of the groove in this case should be about ⅜ in. The preferred embodiment of the weld shaping member is shown in FIG. 4 and will be described hereinafter in greater detail when referring to such figure.

I have also found that the initial current is important for obtaining porosity-free welds at the base of the rail. Initially, I use arc current of from about 500 to about 600 at a voltage of from 35–37 volts D.C.R.P.-C.P. and then once the welding action becomes quiescent, I increase the current to about 700 to about 800 amperes. In this manner, most of the gases which would produce porosity are permitted to escape through the molten metal and slag.

Further, I prefer to use a consumable wire having the following chemical analysis:

|  | Weight percent |
| --- | --- |
| C | 0.55–0.67 |
| Mn | 0.90–1.25 |
| P | max__ 0.025 |
| S | max__ 0.025 |
| Si | max__ 0.25 |
| Al | max__ 0.60 |
| Balance | Iron |

This wire chemistry closely approximates the chemistry of the rail steel. Molybdenum may or may not be used, depending on the hardness desired. Usually 0.35–0.55 molybdenum is desired in the welding wire to compensate for loss of carbon by burn-out. This wire will deposit weld metal having essentially the same hardness as the unaffected rail steel.

Having described the invention in a general way, reference is now made to the figures for a more detailed description which will enable one skilled in the art to practice the teachings that I hereby make to the art.

Typical apparatus for practicing the preferred embodiment shown in FIG. 1 comprises a stationary consumable current-carrying member 10, through which passes a consumable welding wire 12 supplied from a wire reel 14. The wire is fed by feed rails 15 driven by a motor (not shown) to the current-carrying member 10. The current-carrying member 10 is positioned between the parallel spaced faces of the rails 16 to be welded. The rails 16 are supported on a base member 17 wherein is provided a starting reservoir 18. The rails 16 are centered on the reservoir 18.

Weld shaping members 19 are clamped to the outside surfaces of the rails 16 to define the shape of the weld made between the rails. The contour of these members 19 is important for obtaining successful welds. For example, in the preferred embodiment when welding 115 RE rail and 127 Dudley rails spaced ¾ in. apart, the width A of the groove in the member 19 should be approximately 1 3/16 in. (see FIG. 4). If the width of the groove A becomes much less than 1 3/16 in., severe undercutting appears along the edge of the vertical weld. In the preferred weld shaping member shown in FIG. 4, the depth B of the groove is desirably about ⅜ in.

I have also found that the face F of the weld shaping member at the junction of the rail web W and the rail head H must have relief. This relief R is preferably about 5/16 in. when welding 115 RE and 127 Dudley rails. The reason for the relief is that the current-carrying member 10 and welding head WH are oscillated when the advancing weld puddle advances to the widening of the rail section at the junction of the rail web W to the rail head H as will be described hereinafter. When oscillating, the thermal energy of the arc is directed against the surface of the shaping member 19 which causes melting of the member and welding thereof to the rail which, of course, is to be avoided in this case.

A suitable source of welding current 20, preferably a constant potential source, has one terminal connected to the welding head and energizes the current-carrying member 10 and wire 12. The other terminal of source 20 is connected to the base member 17. Best results are obtained when the current-carrying member is negative and the base member is positive although it is not essential to the successful performance of the invention.

In operation, after the rails 16 are spaced on the base member 17 centered over starting reservoir 18 and the first welding composition is provided in such reservoir to cover a starting fuse ball located between the wire 12 and the base member 17 and the weld shaping members 19 are clamped in place, an arc is established between the wire 12 and base member 17 in the starting reservoir 18. The wire 12 and current-carrying member 10 are progressively consumed. After a quiescent condition is achieved, the current is increased from about 500 to 600 amperes, D.C.R.P. at 35 to 37 volts, to about 700 to 800 amperes and a second different composition is added as needed to maintain the quiescent condition. When the molten metal has risen in the cavity formed by the rails 16 and the shaping members 19 to a point at the junction of the rail web W to the rail head H, the current-carrying member 10 and welding head WH are oscillated parallel with the rail face in order to bring the welding action to all faces of the rail head. The first and second oscillations are at an amplitude of 1 in.; the remaining oscillations are at an amplitude of 2 in. The oscillating motion continues until the rail head section is completely welded. When the weld metal reaches the top of the rail head the welding current is reduced to about 400 amperes and the welding cycle is continued until the weld metal fills the riser section. When this occurs, the power is shut-off and the cycle is completed.

While the above invention has been described with reference to the preferred embodiment, certain modifications may be made without departing from the spirit of the invention. For example, the current-carrying member could be nonconsumable in which case the welding head would be raised as the weld progressed. Further, the process can be carried out in the welding of other shaped workpieces.

What is claimed is:

1. Method for welding railroad rails including base, web and head sections which comprises positioning the rails to be welded with their faces in parallel spaced relation, supporting said rails on a base member having an opening therein to provide a starting reservoir for the weld to be made, centering said rails on said reservoir, positioning a current-carrying member in the space between said rail faces, placing weld shaping members contoured to fit the rail sections on such sections to form a cavity enclosing said current-carrying member and to define the shape of said weld to be made, passing a consumable wire through one end of said current-carrying member until it emerges from the other end thereof, placing a measured amount of a first welding composition in said starting reservoir to cover the end of said wire, initially striking an arc in said starting reservoir, maintaining the arc current at a preselected starting value until a quiescent condition is achieved in such reservoir, increasing said current to a preselected welding value, progressively consuming said wire, adding a second different welding composition during the progression of said weld to maintain said quiescent condition, commencing oscillation of said wire parallel to the rail faces when the weld puddle has risen to a point at the junction of the rail web section to the rail head section, reducing said welding current to a preselected weld-finishing value when the weld puddle reaches the top of the head section and continuing at this level until the weld puddle forms a riser on the rail head.

2. Method for welding railroad rails including base, web and head sections which comprises positioning the rails to be welded with their faces in parallel spaced relation, supporting said rails on a base member having an opening therein to provide a starting reservoir for the weld to be made, centering said rails on said reservoir, positioning a consumable current-carrying member in the space between said rail faces, placing weld-shaping members contoured to fit the rail sections on such sections to form a cavity enclosing said current-carrying member and to define the shape of said weld to be made, passing a consumable wire through one end of said current-carrying member until it emerges from the other end thereof, placing a measured amount of a first welding composition in said starting reservoir to cover the end of said wire, initially striking an arc in said starting reservoir, maintaining said arc at an arc current of from about 500 to about 600 amperes at a voltage of from about 35 to about 37 volts until a quiescent condition is achieved, increasing said current to from about 700 to about 800 amperes at a voltage of from about 35 to about 37 volts, progressively consuming said wire and said consumable current-carrying member, adding a second different welding composition during the progression of said weld to maintain said quiescent condition, commencing oscillation of said wire parallel to the rail faces when the weld puddle has risen to a point at the junction of the rail web section to the rail head section, reducing said welding current to about 400 amperes when the weld puddle reaches the top of the head section and continuing at this level until the weld puddle forms a riser on the rail head.

3. Method for welding railroad rails including base, web and head sections which comprises positioning the rails to be welded with their faces in parallel spaced relation, supporting said rails on a base member having an opening therein to provide a starting reservoir for the weld to be made, centering said rails on said reservoir, positioning a current-carrying member in the space between said rail faces, placing weld shaping members contoured to fit the rail sections on such sections to form a cavity enclosing said current-carrying member and to define the shape of said weld to be made, passing a consumable wire through one end of said current-carrying member until it emerges from the other end thereof, placing a measured amount of a first welding composition having the following chemical analysis:

|  | Minimum, Percent | Maximum, Percent |
| --- | --- | --- |
| CaO+BaO | 19.50 | 22.50 |
| CaF₂ | 5.00 | 7.00 |
| MgO | 10.00 | 12.00 |
| SiO₂ | 34.00 | 38.00 |
| Al₂O₃ | 11.50 | 13.50 |
| MnO | 6.00 | 8.00 |
| Cr₂O₃ | 4.50 | 5.50 |
| MoO₃ | 0.50 | 1.00 | in said starting reservoir to cover the end of said wire, initially striking an arc in said starting reservoir, maintaining said arc at an arc current of from about 500 to about 600 amperes at a voltage of from about 35 to about 37 volts until a quiescent condition is achieved, increasing said current to from about 700 to about 800 amperes at a voltage of from about 35 to about 37 volts, progressively consuming said wire, adding a second different welding composition during the progression of said weld to maintain said quiescent condition, commencing oscillation of said wire parallel to the rail faces when the weld puddle has risen to a point at the junction of the rail web section to the rail head section, reducing said welding current to about 400 amperes when the weld puddle reaches the top of the head section and continuing at this level until the weld puddle forms a riser on the rail head.

4. Method for welding railroad rails including base, web and head sections which comprises positioning the rails to be welded with their faces in parallel spaced relation, supporting said rails on a base member having an opening therein to provide a starting reservoir for the weld to be made, centering said rails on said reservoir, positioning a current-carrying member in the space between said rail faces, placing weld shaping members contoured to fit the rail sections on such sections to form a cavity enclosing said current-carrying member and to define the shape of said weld to be made, passing a consumable wire through one end of said current-carrying member until it emerges from the other end thereof, placing a measured amount of a first welding composition having the following chemical analysis:

|  | Preferred percent |
| --- | --- |
| CaO+BaO | 21.00 |
| CaF₂ | 6.00 |
| MgO | 11.00 |
| SiO₂ | 36.00 |
| Al₂O₃ | 12.50 |
| MnO | 7.00 |
| Cr₂O₃ | 5.00 |
| MoO₃ | 0.70 | in said starting reservoir to cover the end of said wire, initially striking an arc in said starting reservoir, maintaining said arc at an arc current of from about 500 to about 600 amperes at a voltage of from about 35 to about 37 volts until a quiescent condition is achieved, increasing said current to from about 700 to about 800 amperes at a voltage of from about 35 to 37 volts, progressively consuming said wire, adding a second different welding composition during the progression of said weld to maintain said quiescent condition, commencing oscillation of said wire parallel to the rail faces when the weld puddle has risen to a point at the junction of the rail web section to the rail head section, reducing said welding current to about 400 amperes when the weld puddle reaches the top of the head section and continuing at this level until the weld puddle forms a riser on the rail head.

5. Method for welding railroad rails including base, web and head sections which comprises positioning the rails to be welded with their faces in parallel spaced relation, supporting said rails on a base member having an opening therein to provide a starting reservoir for the weld to be made, centering said rails on said reservoir, positioning a current-carrying member in the space between said rail faces, placing weld shaping members contoured to fit the rail sections on such sections to form a cavity enclosing said current-carrying member and to define the shape of said weld to be made, passing a consumable wire through one end of said current-carrying member until it emerges from the other end thereof, placing a measured amount of a first welding composition having the following chemical analysis:

|  | Minimum, Percent | Maximum, Percent |
| --- | --- | --- |
| CaO+BaO | 19.50 | 22.50 |
| CaF₂ | 5.00 | 7.00 |
| MgO | 10.00 | 12.00 |
| SiO₂ | 34.00 | 38.00 |
| Al₂O₃ | 11.50 | 13.50 |
| MnO | 6.00 | 8.00 |
| Cr₂O₃ | 4.50 | 5.50 |
| MoO₃ | 0.50 | 1.00 | in said starting reservoir to cover the end of said wire, initially striking an arc in said starting reservoir, maintaining said arc at an arc current of from about 500 to about 600 amperes at a voltage of from about 35 to about 37 volts until a quiescent condition is achieved, increasing said current to from about 700 to about 800 amperes at a voltage of from about 35 to about 37 volts, progressively consuming said wire, adding a second different welding composition having the following chemical analysis:

| | Weight percent |
|---|---|
| CaO+BaO | max__ 5.00 |
| $SiO_2$ | 43.00–47.00 |
| $Al_2O_3$ | 21.00–25.00 |
| FeO | max__ 3.00 |
| MgO | 23.00–27.00 |
| $Cr_2O_3$ | max__ 3.00 |
| S | max__ 0.07 |
| $CaF_2$ | 3.50–5.50 | during the progression of said weld to maintain said quiescent condition, commencing oscillation of said wire parallel to the rail faces when the weld puddle has risen to a point at the junction of the rail web section to the rail head section, reducing said welding current to about 400 amperes when the weld puddle reaches the top of the head section and continuing at this level until the weld puddle forms a riser on the rail head.

6. Method for welding railroad rails including base, web and head sections which comprises positioning the rails to be welded with their faces in parallel spaced relation, supporting said rails on a base member having an opening therein to provide a starting reservoir for the weld to be made, centering said rails on said reservoir, positioning a current-carrying member in the space between said rail faces, placing weld shaping members contoured to fit the rail sections on such sections to form a cavity enclosing said current-carrying member and to define the shape of said weld to be made, passing a consumable wire through one end of said current-carrying member until it emerges from the other end thereof, placing a welding composition in said starting reservoir to cover the end of said wire, initially striking an arc in said starting reservoir maintaining said arc at an arc current of from about 500 to about 600 amperes at a voltage of from about 35 to about 37 volts until a quiescent condition is achieved, increasing said current to from about 700 to about 800 amperes at a voltage of from about 35 to about 37 volts, progressively consuming said wire, commencing oscillation of said wire parallel to the rail faces when the weld puddle has risen to a point at the junction of the rail web section to the rail head section, reducing said welding current to about 400 amperes when the weld puddle reaches the top of the head section and continuing at this level until the weld puddle forms a riser on the rail head.

References Cited by the Examiner

UNITED STATES PATENTS 2,824,952  2/58  Zoethout _____ 219—137

FOREIGN PATENTS 761,680  3/56  Great Britain.

RICHARD M. WOOD, *Primary Examiner.*